United States Patent [19]
Slater et al.

[11] Patent Number: 6,038,363
[45] Date of Patent: Mar. 14, 2000

[54] FIBER-OPTIC SPECTROSCOPIC PROBE WITH REDUCED BACKGROUND LUMINESCENCE

[75] Inventors: Joseph B. Slater, Ypsilanti; Michael J. Pelletier, Saline, both of Mich.

[73] Assignee: Kaiser Optical Systems, Ann Arbor, Mich.

[21] Appl. No.: 08/918,459

[22] Filed: Aug. 26, 1997

Related U.S. Application Data

[60] Provisional application No. 60/025,109, Aug. 30, 1996.

[51] Int. Cl.[7] .................................. G02B 6/00; G01J 3/44
[52] U.S. Cl. ............................ 385/147; 385/12; 356/301; 356/318
[58] Field of Search ..................... 385/12, 147; 356/301, 356/318, 305, 310, 328–330

[56] References Cited

U.S. PATENT DOCUMENTS

| 5,112,127 | 5/1992 | Carrabba et al. | 356/301 |
| 5,377,004 | 12/1994 | Owen et al. | 356/301 |
| 5,424,825 | 6/1995 | Delhaye et al. | 356/318 |
| 5,615,673 | 4/1997 | Berger et al. | 356/301 |
| 5,710,626 | 1/1998 | O'Rourke et al. | 385/12 |

*Primary Examiner*—Hemang Sanghavi
*Attorney, Agent, or Firm*—Gifford, Krass, Groh, Sprinkle, Anderson & Citkowski, PC

[57] ABSTRACT

A fiber-optic spectroscopic probe minimizes unwanted sources of luminescence through the use of one or more non-luminescing beam-redirecting elements operative to aperture share the optical collection path. Preferably, the beam-redirecting element is reflective, and may take the form of a spot mirror on an otherwise optically transparent window to fold at least a portion of the excitation radiation into the optical collection path or a mirror having a centralized aperture may be used to introduce the excitation radiation into the optical collection path. In either case, the excitation radiation may first pass through a dispersive element in a bandpass filter configuration. Several complete fiber-optic-based probe head designs are disclosed along with results indicating reduced luminescence, spurious fluorescence, in particular.

20 Claims, 2 Drawing Sheets

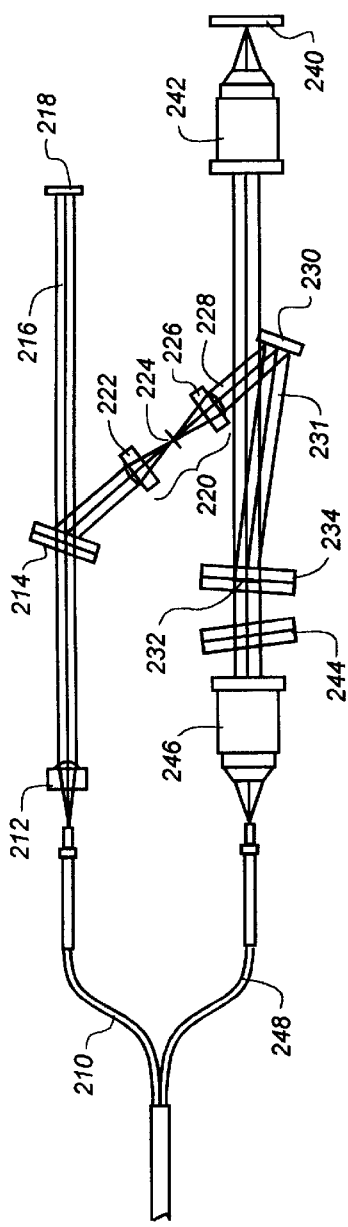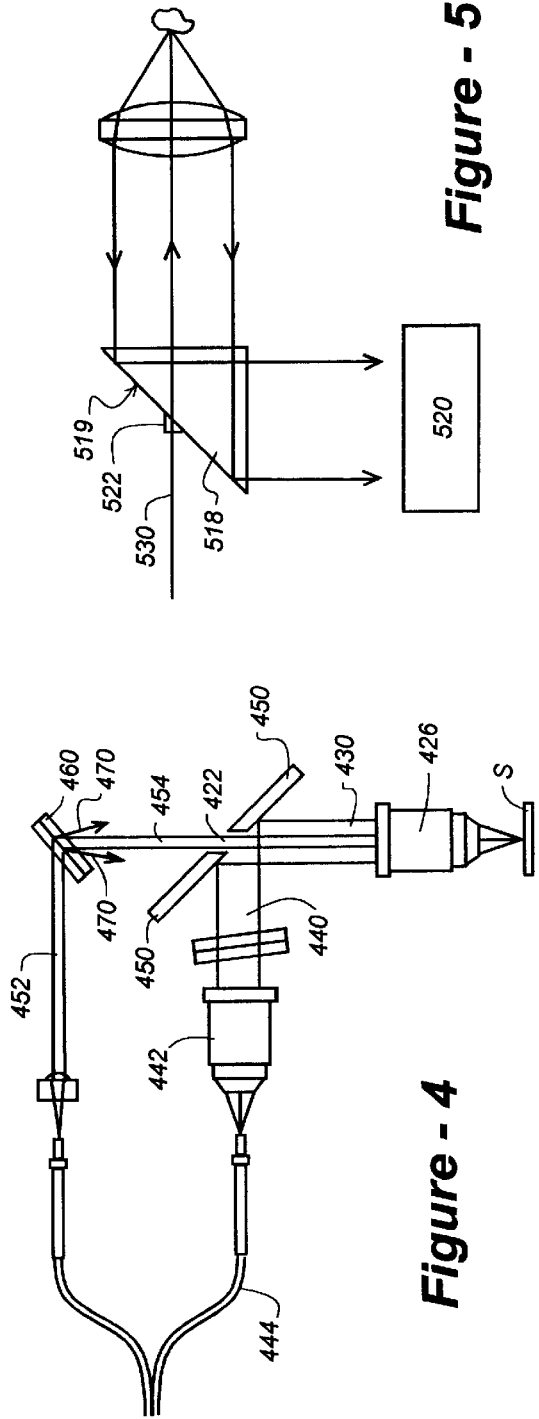

FIBER-OPTIC SPECTROSCOPIC PROBE WITH REDUCED BACKGROUND LUMINESCENCE

REFERENCE TO THE RELATED APPLICATION

This application claims priority of U.S. provisional application Ser. No. 60/025,109, filed Aug. 30, 1996, the entire contents of which are incorporated herein by reference.

FIELD OF THE INVENTION

The present invention relates generally to optical analytical instrumentation, including Raman spectroscopic apparatus and, more particularly, to fiber-optic probe wherein background luminescence is minimized.

BACKGROUND OF THE INVENTION

Fiber optic probes make it possible to collect spectral information such as Raman spectra without having to place the material being characterized inside a spectrometer housing. Such probes therefore simplify the interfacing of spectroscopic systems to chemical processes, and allow analytical instruments to be located remotely from hostile environments in need of spectroscopic monitoring.

Among the first remote fiber-optic probes for Raman spectroscopy were reported by the McCreery group in the early 1980's. Their design used a single optical fiber to deliver laser light to the sample and a single optical fiber to collect light scattered by the sample. More specifically, divergent laser light from the laser delivery fiber was used to illuminate the sample, and light scattered from the sample within the acceptance cone of the collection fiber was transmitted back to the spectrograph. The efficiency of exciting and collecting Raman photons from any individual point in the sample was poor, but the integrated Raman intensity over the unusually large analysis volume compared favorably with the more traditional imaged illumination and collection.

McCreery's dual fiber Raman probe offered important benefits for remote and routine spectroscopy: 1) the sample could be distant from the Raman instrument, 2) no sample alignment was necessary once the probe was aligned to the spectrograph, 3) the probe could be less than 1 mm in diameter, making Raman measurements possible for samples with limited accessibility, 4) the probe could be placed directly in hostile samples (corrosive, hot, etc.) since only silica and the encapsulation material were exposed, and 5) multiple measurements could be made simultaneously by placing multiple collection fibers along the slit height of the spectrograph.

Several improvements to the McCreery Raman probe have more recently been reported. Instead of using just one collection fiber, multiple fibers have been used to increase the collection efficiency. For example, 6 fibers, each having the same diameter as the excitation fiber, may be grouped around the excitation fiber to form a single circular collection layer, as shown in U.S. Pat. No. 4,573,761. Eighteen fibers, each having the same diameter as the excitation fiber, may also be grouped around the excitation fiber as two circular layers, and so on, though successive layers tend to be less effective at collecting Raman photons than the first layer.

The performance of the McCreery type probe can also be modified for improved collection efficiency and/or working distance by changing the overlap between the emission cone of the excitation fiber and the collection cones of the collection fibers. The first realization of this idea, reported by McLachlan, U.S. Pat. No. 4,573,761, angled the collection fibers such that their optic axes intersected the optic axis of the illumination fiber. This increased the overlap of the excitation and collection cones close to the tip of the fiber probe, where the excitation and collection of Raman photons was most efficient. The same concept was later implemented in a different way by O'Rouke, who ground the tip of the probe into a cone shape, as discussed in U.S. Pat. No. 5,402,508. This shape was equivalent to putting prisms (or more correctly, axicon sections) on the collection fibers so that their optic axes crossed the optic axis of the excitation fiber.

A serious problem with all of the fiber optic Raman probes discussed so far is probe background. Laser light inside an optical fiber generates Raman and fluorescence emission from the fiber core itself. This emission can overwhelm the desired Raman signal from the sample and is the reason that the intense excitation light must be carried by a fiber separate from the collection fiber(s). Nevertheless, emission generated in the excitation fiber can reflect from the sample into the collection cones of the collection fibers. Likewise, laser light reflected from the sample into the collection cones of the collection fibers generates the emission while propagating through the collection fibers back to the spectrograph. Symmetry arguments predict that the optical fiber emission observed at the spectrograph will have equal contributions from the excitation fiber and the collection fibers if the length of the excitation fiber is the same as the length of the collection fibers.

When a McCreery-style probe is inserted into a transparent solution, or into a homogeneous partially absorbing solution, reflection of laser light or fiber emission back to the collection fibers is negligible and the optical fiber emission is not observed. Raman spectra of solid samples tend to suffer from probe background. The impact of this background can sometimes be reduced to acceptable levels by angling the probe with respect to the sample surface normal, by eliminating the spectral region containing the fiber emission from the analysis, or by spectral subtraction of the fiber emission.

For many Raman applications elimination of the optical fiber background is at least desirable, if not necessary. The O'Rouke group and other groups have inserted a thin-film dielectric interference filter into the excitation fiber to filter out some of the optical fiber background. One way to do this was to place the filter inside an SMA-to-SMA connector and put the fibers in contact with the filter. Another way to do this was to collimate the laser output from a fiber, send the collimated beam through the filter, and focus the transmitted light back onto the other fiber. Both approaches require precise alignment and attenuate the laser energy. More importantly, the laser energy must still travel through several centimeters to several meters of fiber between the filter and the probe tip, depending on geometry constraints of the specific application. Emission from this intermediate length of fiber optic cable is still a serious problem.

In-line filters can also be added to the collection fibers, but the same limitations apply. In addition, the use of separate filters on each collection fiber rapidly becomes impractical. The use of a single filter for the collection fiber bundle requires precise rotational alignment, in addition to precise translational alignment. One other approach, coupling the collection fiber bundle to a single large fiber prior to filtering, seriously reduces optical throughput because the larger fiber couples more poorly to spectrographs.

A more effective approach for eliminating optical fiber background was described by Carrabba et al. They described an optical probe head located between the sample and the optical fibers. The probe head removed the fiber background from the excitation fiber and removed scattered laser light before the Raman signal reached the collection fiber. An improved probe head based on this concept was later described by Owen et al. An additional feature of these probe heads was the use of imaged excitation and collection. Imaged excitation and collection, compared with the non-imaged approach of the McCreery-style probes, offer smaller measurement areas on the sample, smaller depth-of-focus, and a variable working distance between the probe and the sample.

A serious problem with all of the fiber optic Raman probes discussed so far is probe background. The laser light used for sample excitation can also generate undesirable luminescence, including Raman scattering and fluorescence. It has been determined, for example, that certain materials placed in the optical collection path may exhibit undesirable luminescence when excited by the commonly used laser source, or by sample emissions, or both. It is known, for instance, that certain adhesives used in forming multilayer optical elements generate undesirable luminescence, particularly fluorescence, and that the dielectric coatings or dichromated gelatin (DCG) used to form holographic optical elements may produce unwanted signatures as well. Such emissions, if allowed to propagate through the collection fibers back to the spectrograph, can overwhelm the desired Raman signal from the sample. Thus, any technique to reduce these sources of noise would be welcomed by those seeking greater performance or accuracy from instruments incorporating these optical components.

Most fiber optic probes used for Raman 180° backscattering described in the literature use an amplitude-splitting beam combiner to overlap the excitation and collection optical paths. The beam combiner is a major source of probe background. Wavefront-splitting beam combiners are commonly used in directly-coupled Raman spectroscopy instruments. Wavefront-splitting beam combiners can be designed to have negligible luminescence background. No designs for fiber optic probes using wavefront-splitting beam combiners have been reported in the literature.

SUMMARY OF THE INVENTION

The present invention minimizes unwanted sources of luminescence in fiber-optic spectroscopic-type probes through the use of one or more non-luminescing elements placed in the optical collection path in an aperture-sharing configuration. Though the invention may be used in a variety of circumstances, a preferred application is Raman spectroscopy, wherein common optics may be used for both the focussing of the excitation radiation and collimation of the spectra emitted by the sample.

In one embodiment, a spot mirror, formed onto a larger transparent window is used to fold the excitation radiation from an input fiber into the optical collection path. A small prism may alternatively be used for this purpose. The beam may also be conditioned prior to impinging on the mirror or prism, for example, to exhibit a smaller cross section or for collimation purposes. In a disclosed example, a pair of lenses and a spatial filter are utilized to reduce the cross section of the input beam while maintaining collimation.

In an alternative embodiment, the aperture sharing in the collection path is arranged conversely; that is, a mirror larger than the cross-section of the entire collection path, includes a small aperture through which the excitation radiation is introduced into the collection path. In this and other embodiments, a dispersive element may be placed in the excitation path prior to the aperture sharing, enabling the spot-mirror/prism or apertured mirror to function cooperatively with the dispersive element as a laser bandpass filter. Other beam-shaping and beam-modifying elements may optionally be used as further disclosed herein.

BRIEF DESCRIPTION OF THE DRAWINGS

FIG. 2 is a top-down, simplified view of an optical arrangement using the invention in a fiber-coupled probe head configuration;

FIG. 4 is a drawing of an alternative embodiment of the invention wherein an apertured mirror is used as a collection-path aperture-sharing element along with an optional diffractive element to provide a laser-bandpass function; and FIG. 5 illustrates yet a further alternative embodiment according to the invention wherein one or more prisms are used in conjunction with the delivery of excitation energy to a sample and/or the collection spectra therefrom.

DETAILED DESCRIPTION OF THE PREFERRED EMBODIMENT

Figure 1:
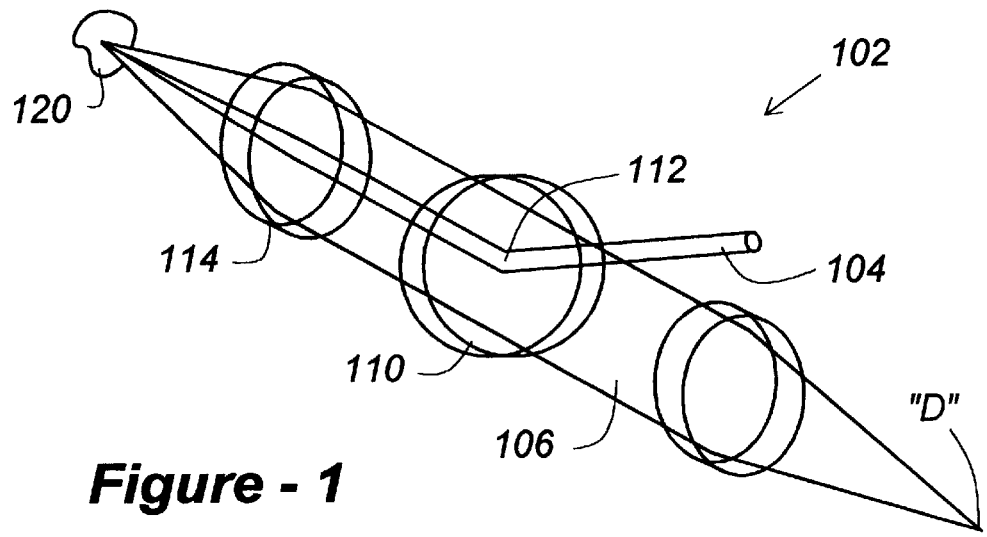
FIG. 1 is a schematic illustration, as seen from an oblique perspective, which depicts a spot-mirror embodiment of the invention.

FIG. 1 illustrates an existing backscatter geometry which has become popular for backscattered emission collection, for example, in Raman sampling systems. In this arrangement, depicted generally at 162, excitation radiation 104, typically from a laser source, is combined with a counter-propagating data collection path 106 by means of a wavelength sensitive beamsplitter 110, as shown. A persistent problem with this approach is that the beamsplitter 110, typically a holographic or dielectric element, introduces contamination and spectral artifacts in the collected light path 106.

According to the present invention, this problem is mitigated through the use of a non-luminescing mirrored element which shares the aperture of the optical collection path. Although the concept is applicable to a range of optical arrangements, the preferred implementation is in a fiber-optic-based optical probe head associated with Raman spectroscopy.

In one embodiment, a small metallic spot mirror is disposed in the collection beam at point 112, this mirror being operative to fold the excitation beam 104 into the collection path 106, preferably, but not necessarily, in a parallel, counter-propagating geometry. This mirror produces no signal contamination. Although the mirror does obscure a percentage of the collection path aperture, the relatively small amount of collection loss does not significantly affect overall system performance, particularly with the removal of the unwanted luminescence.

In the embodiment of FIG. 1, a sample optic 114 is used both to focus the redirected beam 104 and to collimate the scattered light from the sample 120. This configuration enables the excitation light to be brought in from the side of the collection path as shown, and with a large enough sample optic 114, very little of the collected signal is sacrificed, though this sampling geometry does become somewhat alignment sensitive.

In practice, the relative size of the spot mirror (or aperture in a larger mirror as described below), may be a function of various considerations, depending upon the optical arrangement required for a given application. For example, in a microscope application, it may be advantageous to use existing sample optics, which may require an optical beam having a cross section in a particular range to ensure adequate focus. In such a case, it may be more important that the input beam be within this range than the efficiency be optimum. On the other hand, depending upon the configuration, if collection efficiency is paramount, one may opt for input beam reduction, thus increasing the ratio of aperture sharing and enhancing collection efficiency, even if at the expense of focusing resolution.

FIG. 2 illustrates the spot-mirror embodiment of the invention as applied to a fiber-optic probe head design. Note that in this illustration and others contained herein, various features may not be to scale, including the size of the excitation beam and the size of the aperture 422 discussed below. Excitation radiation is brought in via a first fiber 210, with a first lens 212 being optionally employed to improve collimation of the input beam. An optical grating 214, preferably of holographic derivation, is used to filter the beam by removing non-primary wavelength components, including those which may have been introduced through scattering of the materials from which the fiber 210 is composed. The unfiltered portion of the beam 216 is conducted through the grating 214 and may impinge upon an indicator 218 supported on the surface of an appropriate enclosure (not shown).

The grating 214 provides a laser bandpass function. Although the spatial filter arrangement 220 is not necessary according to the invention, the combination of elements does result in an output, collimated beam 228 which may be smaller (or larger) in cross-section as compared to the unconditioned laser beam while, at the same time, maintaining or achieving a higher degree of collimation.

In this particular fiber probe configuration, the beam 228 strikes a small reflector 230, and is redirected as beam 231 onto the spot mirror 232, which is preferably formed by deposition of a centralized region onto a transparent window 234. Upon being reflected by the spot mirror 232, the input excitation energy is directed to a sample 240 through a sample optic 242. The optical collection path proceeds back through the sample optic 242 in a counter-propagating manner back through window 234 and around mirror 232, and is focused by lens 246 onto the output collection fiber 248. A notch filter 244 is preferably utilized in the collection path to remove Rayleigh scattered radiation and/or any backscattered radiation at the laser frequency.

In a preferred embodiment, the excitation fiber 210 may be a single-mode fiber, which may be advantageous in the shared aperture configurations of this invention. Although multi-mode fiber would function in this application, this would require a larger spot mirror, which would lead to increased obscuration. The use of a single-mode fiber to deliver the excitation radiation is not an obvious design choice, as the alignment of the single-mode fiber requires much greater alignment accuracy (adjustments on the order of 0.1 $\mu$m rather than 1.0 $\mu$m), and the maximum efficiency of coupling the laser beam into a single-mode fiber is less (70–80%) than can be achieved with a multi-mode fiber (90%).

Figure 3:
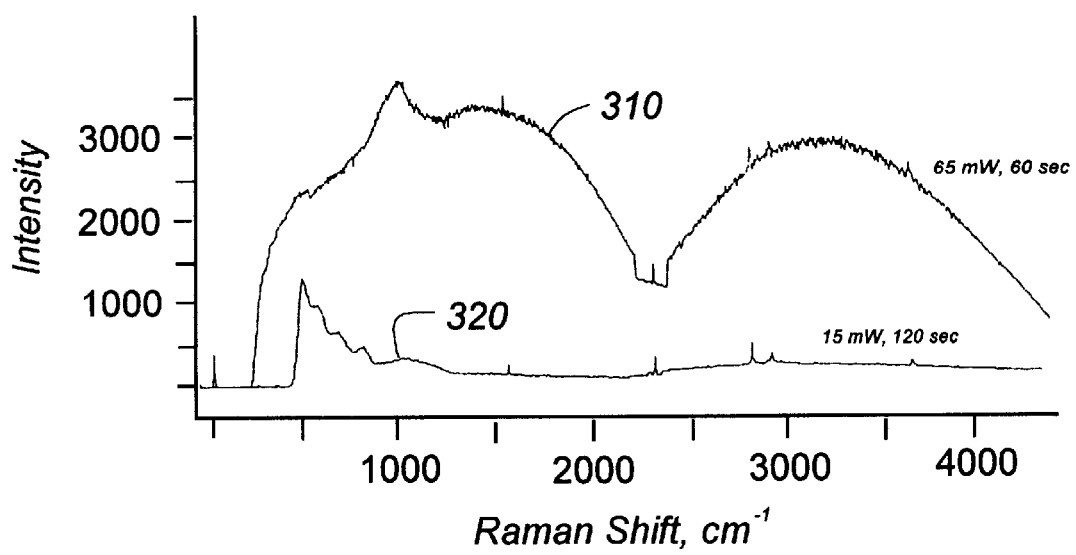
FIG. 3 is diagram which plot output response versus wave number, exemplifying how use of the invention minimizes fluorescence in a Raman scattering spectrometer application.

FIG. 3 is a plot of intensity versus Raman shift for methanol vapor using a fiber-optic probe similar to that just described with reference to FIG. 2, with and without the incorporation of the inventive approach. Curve 310 illustrates an output without aperture sharing, whereas curve 320 illustrates an output of the same probe incorporating a spectrally neutral spot mirror. A significant amount of undesirable fluorescence is evident in curve 310, due to the use of a holographic beamsplitter and related adhesives. Much of this noise has been removed in curve 320, which is plotted using the same units in the Y direction, and without offset. A reduction in background on the order of 20:1 was realized, and it is anticipated that even lower background performance may be achieved through further optimization.

FIG. 4 depicts, in schematic form, an alternative embodiment of the invention in a Raman spectroscopy application, wherein a mirror 450 is used to send an excitation beam 454 through a centrally formed transparent zone. In this embodiment, a common sample optic, in this case a microscope objective, is used for the dual purpose of focusing the excitation beam onto a sample S and to create a collimated collection beam 430. Collected spectra reflect off of the mirror 450 to an output optic 442, which focusses the energy onto a collection fiber 444. As with the spot mirror approach described earlier, preferably the aperture 422 is relatively small as compared to the cross section of the collection path 430 so as not to impact significantly upon operational efficiency, though a minimum size may be dictated by the focussing resolution of the sample optic 426.

In addition to and operating in concert with the apertured mirror 450, a dispersive element 460 may be added, which not only redirects an input excitation beam 452 along path 454, but also dispersively spreads the excitation beam, causing wavelength lines 470 outside of a preferred, primary wavelength range to be spatially rejected and physically restricted from passing through the aperture 422, thus purifying the spectral content of the beam which ultimately passes through the aperture 422. This combination of elements, which essentially forms a laser bandpass filter, is in keeping with commonly assigned U.S. Pat. No. 5,530,565 entitled HOLOGRAPHIC TRANSMISSION BANDPASS FILTER.

FIG. 5 illustrates yet a further alternative configuration according to the invention for injecting an excitation beam in a probe according to the invention which is similar to the apertured mirror arrangement just described. A prism 518 is used in this case rather than a mirror to steer the Raman or other wavelength toward a spectrometer 520 where Rayleigh scattering will first be removed, presumably through the use of a holographic notch filter. The prism 518 should reflect all of the incident light through total internal reflection, but if the reflection is deficient, the large face 519 could be coated with a reflective coating.

A substantially smaller prism 522 is cemented to the large face 519 of the prism using optical cement, for example, to ensure an intimate optical contact, such that the laser excitation 530 incident from the left passes through the two prisms 522 and 518 as though passing through a window, while, again, the majority of the scattered light continues to be steered toward the spectrometer 520. Losses could further be minimized through the application of anti-reflective coatings on the surfaces that transmit either the excitation or the scattered light.

What is claimed is:

1. A reduced luminescence fiber-optic probe for use with a source of excitation radiation and spectral analysis apparatus, the probe comprising:

a first optical fiber carry the excitation radiation to a sample under investigation;

a sample optic to direct the excitation radiation onto the sample and to carry light emitted by the sample in an optical collection path;

a second optical fiber to carry the light emitted by the sample to the spectral analysis apparatus; and a beam-redirecting element disposed in the collection path enabling the excitation radiation to aperture share a relative small cross section of the collection path in a counter-propagating configuration, the beam-redirecting element exhibiting little or no laser-induced luminescence so as not to introduce undesirable, spurious luminescence into the second optical fiber.

2. The fiber-optic probe of claim 1, wherein the light emitted by the sample is characteristic of Raman scattering.

3. The fiber-optic probe of claim 1, wherein the sample optic forms part of a microscope objective.

4. The fiber-optic probe of claim 1, wherein the beam-redirecting element is a reflective element.

5. The fiber-optic probe of claim 4, wherein the reflective element is a spot mirror on an otherwise optically transparent window, the spot mirror being operative to fold at least a portion of the excitation radiation into the optical collection path.

6. The fiber-optic probe of claim 4, wherein the reflective element is a mirror having a transparent zone through which the excitation radiation is introduced into the optical collection path.

7. The fiber-optic probe of claim 6, further including a dispersive element placed in the path of the excitation radiation prior to its passage through the centralized aperture to bandpass filter the excitation radiation.

8. The fiber-optic probe of claim 1, wherein the first optical fiber is a single-mode fiber and the second optical fiber is a multi-mode optical fiber.

9. The fiber-optic probe of claim 1, further including means for reducing the cross section of the excitation radiation prior to its aperture sharing of the collection path.

10. The fiber-optic probe of claim 1, further including means for collimating the excitation radiation prior to its aperture sharing of the collection path.

11. A reduced luminescence spectral analysis system including a fiber-optic probe, the system comprising:

a source of excitation radiation;

a first optical fiber to carry the excitation radiation to a sample to induce therefrom a spectrum of characteristic wavelengths;

an optical detector for detecting the characteristic wavelengths;

a second optical fiber having an input to carry the characteristic wavelengths to the optical detector, the path between the sample and the input to the second fiber defining an optical collection path;

a sample optic to direct the excitation radiation from the first fiber to the sample and to collect the characteristic wavelengths for integration into the collection path; and a beam-redirecting element disposed in the collection path, enabling the excitation radiation to aperture share a relative cross section of the collection path in a counter-propagating configuration, the beam-redirecting element exhibiting little or no laser-induced luminescence so as not to introduce undesirable, spurious luminescence into the second optical fiber.

12. The fiber-optic probe of claim 11, wherein the wavelengths are characteristic of Raman scattering.

13. The fiber-optic probe of claim 11, wherein the sample optic forms part of a microscope objective.

14. The fiber-optic probe of claim 11, wherein the beam-redirecting element is a reflective element.

15. The fiber-optic probe of claim 14, wherein the reflective element is a spot mirror on an otherwise optically transparent window, the spot mirror being operative to fold at least a portion of the excitation radiation into the optical collection path.

16. The fiber-optic probe of claim 14, wherein the reflective element is a mirror having a transparent zone through which the excitation radiation is introduced into the optical collection path.

17. The fiber-optic probe of claim 16, further including a dispersive element placed in the path of the excitation radiation prior to its passage through the transparent zone to bandpass filter the excitation radiation.

18. The fiber-optic probe of claim 11, wherein the first optical fiber is a single-mode fiber and the second optical fiber is a multi-mode optical fiber.

19. The fiber-optic probe of claim 11, further including means for reducing the cross section of the excitation radiation prior to its aperture sharing of the collection path.

20. The fiber-optic probe of claim 11, further including means for collimating the excitation radiation prior to its aperture sharing of the collection path.

* * * * *